United States Patent [19]
Nam-Su et al.

[11] Patent Number: 5,584,552
[45] Date of Patent: Dec. 17, 1996

[54] SYSTEM FOR ADJUSTING A SIZE OF AN IMAGE PROJECTED ON A SLOPED SURFACE

[75] Inventors: Lee Nam-Su, Kyungki-do; Sim Dae-Sul, Incheon-si, both of Rep. of Korea

[73] Assignee: LG Electronics Inc., Seoul, Rep. of Korea

[21] Appl. No.: 406,345

[22] Filed: Mar. 17, 1995

[30]     Foreign Application Priority Data

Mar. 19, 1994 [KR]    Rep. of Korea .................... 5540/1994

[51]  Int. Cl.⁶ ................................................. G03B 21/53
[52]  U.S. Cl. ................................................. 353/70; 353/69
[58]  Field of Search ............................. 353/70, 69, 101, 353/31, 122; 348/745, 806

[56]                    References Cited

U.S. PATENT DOCUMENTS

| | | | |
|---|---|---|---|
| 4,422,153 | 12/1983 | Arai et al. | 353/70 |
| 5,096,288 | 3/1992 | Yano et al. | 353/69 |
| 5,276,523 | 1/1994 | Kurematsu et al. | 353/101 |
| 5,283,602 | 2/1994 | Kwon | 353/69 |
| 5,400,093 | 3/1995 | Timmers | 353/101 |
| 5,400,095 | 3/1995 | Minich et al. | 353/122 |
| 5,434,632 | 7/1995 | Carmichael | 353/101 |
| 5,455,647 | 10/1995 | Fujiwara | 353/69 |

FOREIGN PATENT DOCUMENTS

| | | | |
|---|---|---|---|
| 0036535 | 2/1991 | Japan | 353/76 |
| 4181934 | 6/1992 | Japan | 353/74 |
| 4355740 | 12/1992 | Japan | 353/69 |

*Primary Examiner*—William Dowling
*Attorney, Agent, or Firm*—Finnegan, Henderson, Farabow, Garrett & Dunner, L.L.P.

[57]                    ABSTRACT

To correct the size of an image projected on a screen surface that is at an oblique angle to a line of projection of a projector, the image is corrected by manual or automatic angular position adjustment of a LCD panel or a mirror. A device for adjusting the image size includes a detector for projecting infrared rays into the screen over a range of projection angles and sensing the amount of infrared rays reflected by the screen. A controller determines a correction angle that is equal to the oblique angle between the screen and the line of projection by observing when the sensed reflected infrared rays reach a maximum amount. A driver, responsive to the controller, then adjusts the angular position of the LCD panel or the mirror by the magnitude of the correction angle, such as to adjust the line of projection into orthogonal relation with the screen.

23 Claims, 9 Drawing Sheets

SYSTEM FOR ADJUSTING A SIZE OF AN IMAGE PROJECTED ON A SLOPED SURFACE

BACKGROUND OF THE INVENTION

1. Field of Invention

This invention relates to a system for correcting an image projected on a surface that is at an oblique angle to a line of projection. The system corrects the displayed image by manual or automatic adjustment of a LCD panel or a mirror angle.

2. Description of Related Art

In general, a domestic projector is used for projecting an image received from a TV or a VCR on a wall or on a separately provided screen for displaying the image.

As shown in FIG. 1, the projector includes a light source 1a for generating light, a focusing lens 1b for focusing the light received from the light source 1a, and a first polarizing plate 1c for polarizing the light passed through the focusing lens 1b. A display element of a liquid crystal display (LCD) panel 1d is composed of pixels arranged in matrix form that are irradiated by the light passing through the polarizing plate 1c. A second polarizing plate 1e polarizes the light of the image displayed on the LCD panel 1d according to video signals received from an external source. A focusing lens 1f is movably mounted for adjusting the distance of the focusing lens to the LCD panel 1d, thereby projecting the video image of to the LCD panel 1d, on an external screen.

However, as shown in FIG. 2, the line of projection may be at an angle α to a wall adjacent a bright window. This line of projection may be necessary due to obstacles in a room or to insufficient space available in a room.

As is commonly known, the image projected on a screen, or a wall surface, at an angle other than a right angle to the screen is distorted. A screen at an oblique angle to the line of projection is referred to as a sloped screen.

Therefore, as shown in FIG. 2, the size of the image projected on the screen of FIG. 1 at an angle sloped to the screen is displayed differently than an original image.

Conventionally, in order to correct the distortion of the image, a user could manually adjust the position of the projector itself to face the screen surface at a ninety degree angle, which may be inconvenient.

SUMMARY OF THE INVENTION

An object of this invention for solving the foregoing problem is to provide a device and a method for correcting an image projected on a sloped surface, that is a surface not at a right angle to the line of projection, that uses a manual adjusting means for adjusting a LCD panel or for adjusting a mirror angle of a projector, thereby correcting the image displayed on the sloped screen while watching the image projected in the sloped direction.

Another object of this invention is to provide a device and a method for correcting an image projected on a sloped surface, which detects an angle between the light axis of the projection and the screen surface, and makes a projection angle of a LCD panel identical to the detected angle.

Another object of this invention is to provide a device and a method for correcting an image projected on a sloped surface, which detects an angle between the light axis of the projection and the screen surface, and adjusts an angle between a mirror and the screen surface.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a device for adjusting a size of an image projected on a screen surface that is at an oblique angle to a line of projection of a projector includes a LCD panel and a sloped surface detector for projecting infrared rays on the screen surface, sensing infrared rays reflected off of the screen surface, and converting the sensed amount of the infrared rays into a digital output value; a controller, responsive to the digital output value, for determining an angle between the screen surface and the line of projection of the projector and for generating a driving control signal based on the sloped angle; and a driver, driven in response to the driving control signal received from the controller for adjusting the size of the image by adjusting the LCD panel. Alternatively, the projector may include a mirror and the driver adjusts the mirror, thereby adjusting the image displayed.

A method for adjusting a size of an image projected on a screen surface that is at an oblique angle to a line of projection of a projector, the method comprising the steps of: projecting infrared rays onto the screen surface in response to an adjustment key signal; receiving and processing infrared rays reflected at the screen surface; determining a time period between the projecting and receiving of the infrared rays; comparing the processed infrared rays to a reference value; and adjusting a LCD panel in the projector based on the determined time period, when the processed infrared rays are different from the reference value. Alternatively, a mirror may be used in the projector and adjusted to thereby adjust the image displayed.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE INVENTION

The principle of this invention will first be explained using an example where a size of an image on a screen is adjusted by adjusting a LCD panel.

Figure 1:
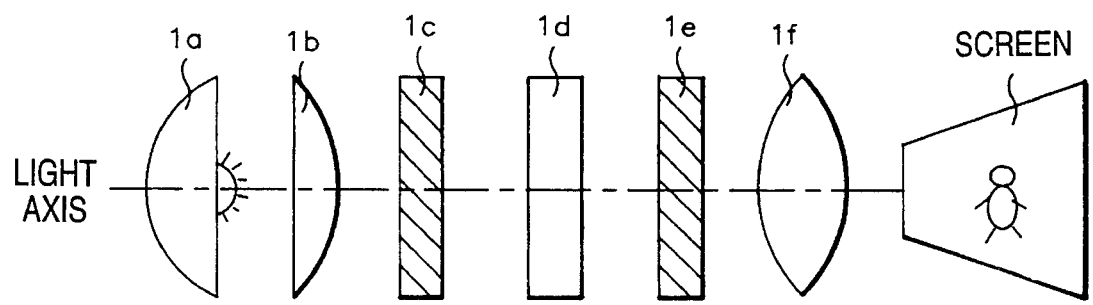
FIG. 1 shows a conventional projector and a distorted image projected on a sloped surface.
Figure 2:
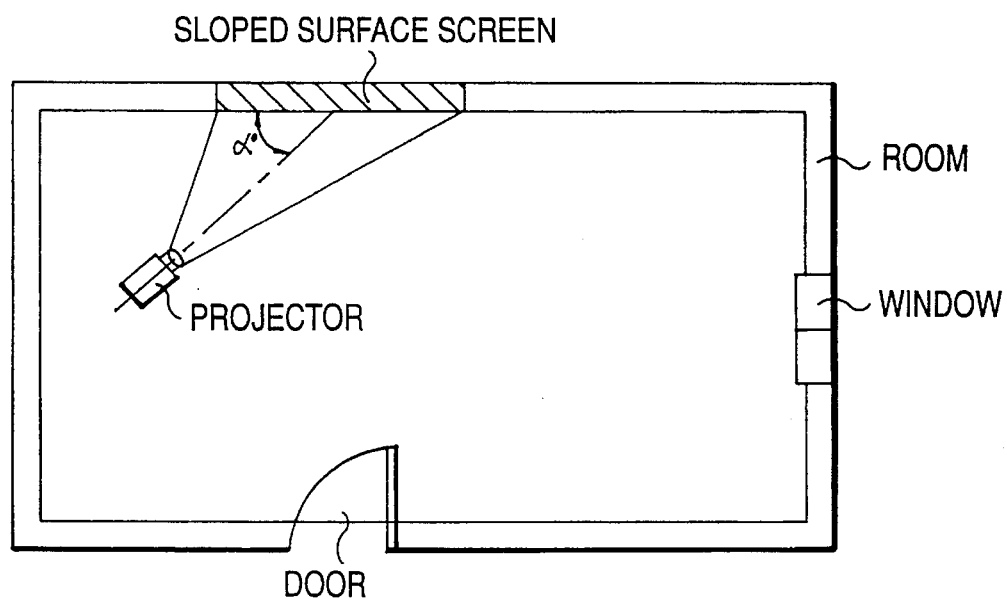
FIG. 2 shows an image projection on a sloped screen provided by a wall of a room.
Figure 3:
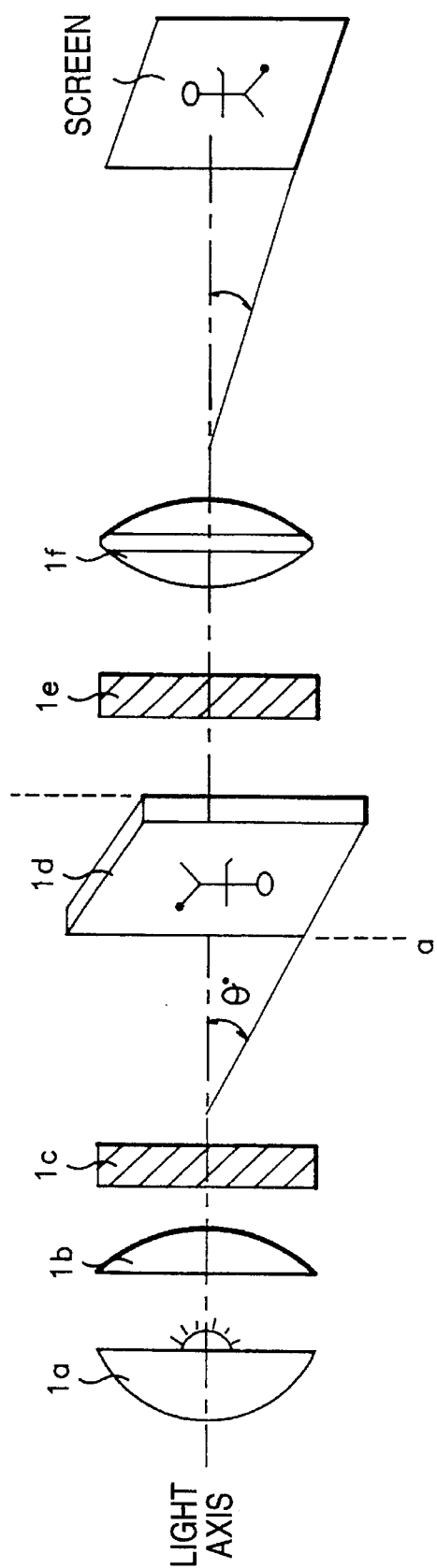
FIG. 3 shows image correction and display on a sloped surface by adjusting an LCD in accordance with this invention.
Figure 4:
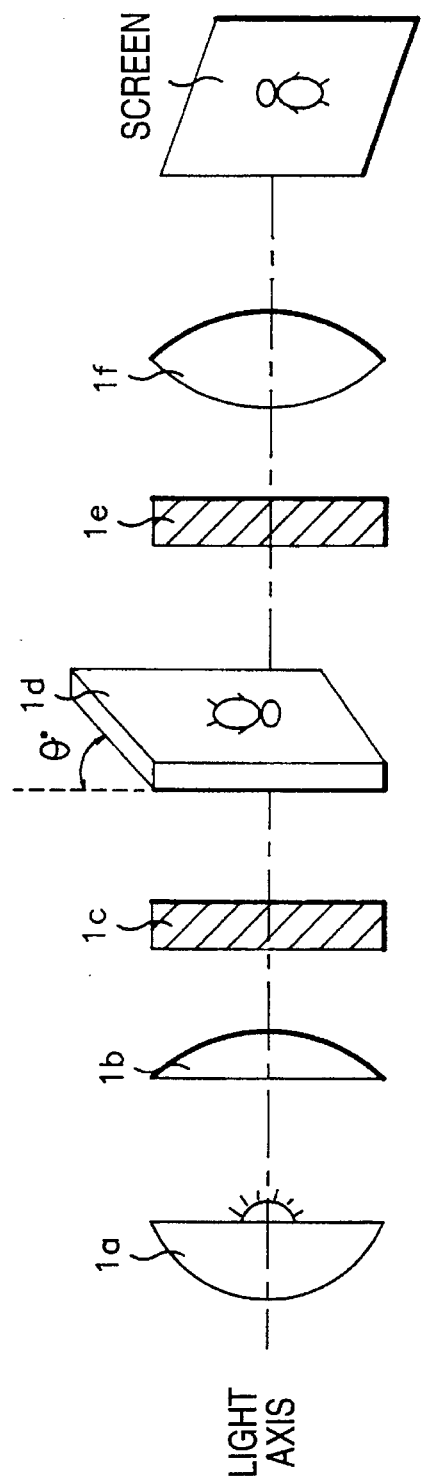
FIG. 4 shows image correction and display on a sloped surface by adjusting an LCD in accordance with this invention.

As shown in FIG. 3, when the image is projected on a wall or screen surface having a slope angle α to a light axis of projection, then an angle θ to the LCD panel 1d should be brought to an angle equal to the slope angle α with respect to a certain point shown as 'a'. When these angles are equal, the previously distorted image, as shown in FIG. 1, will be displayed as a correctly sized image as shown in FIG. 4.

Although a conventional projector can project an image at a slope angle α of 90 degrees, this invention is designed to satisfy all slope angles α that are less than or equal to 90 degrees.

Figure 5:
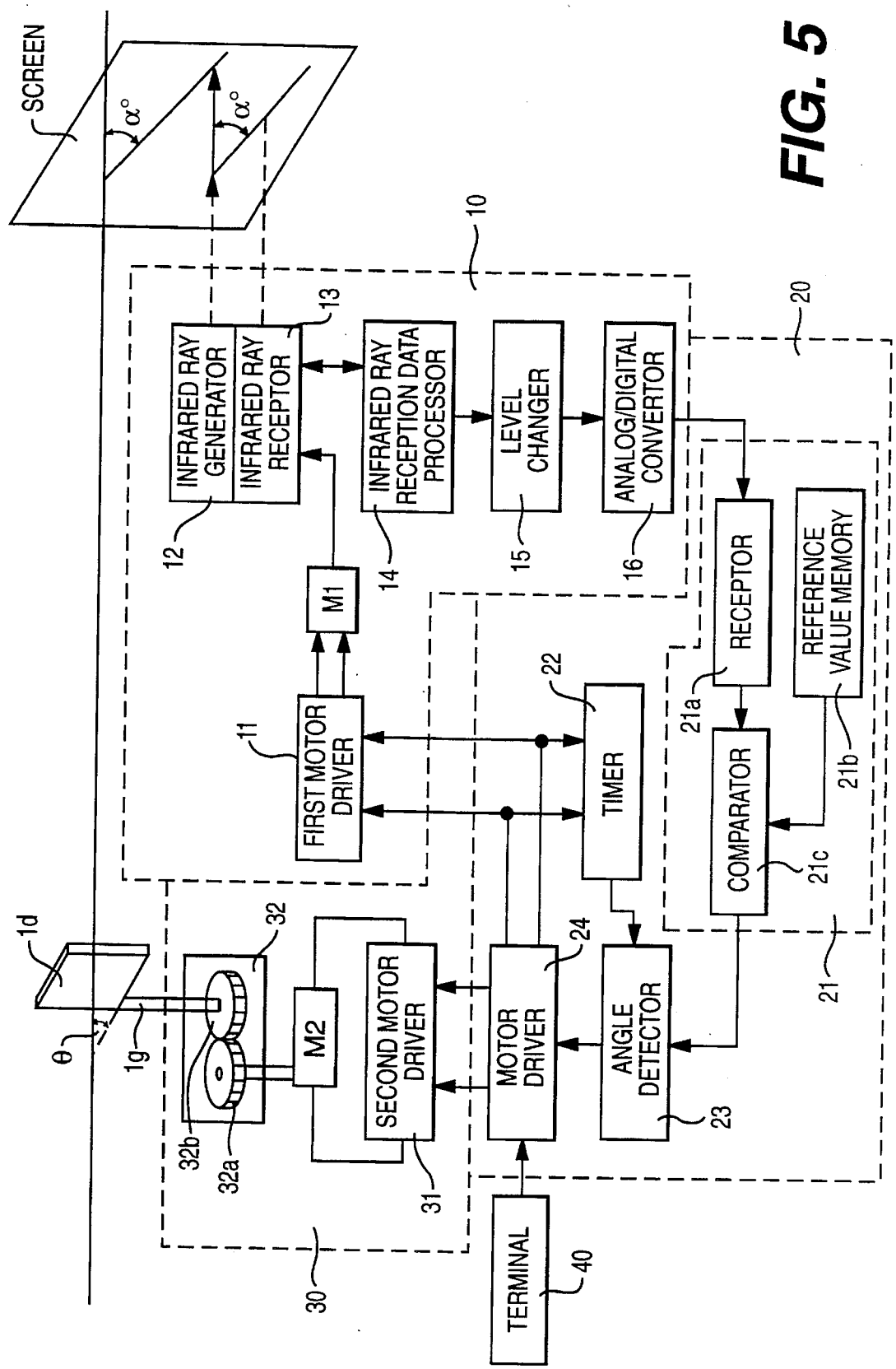
FIG. 5 is a block diagram of a system for correcting an image projected on a sloped surface in accordance with a first embodiment of this invention.

FIG. 5 is a block diagram showing a system for correcting an image projected on a sloped surface in accordance with the first embodiment of this invention. The system shown in FIG. 5 includes a sloped surface detector 10, a controller 20, a driver 30, and a terminal 40.

The sloped surface detector 10 projects infrared rays on the screen, senses the reflected infrared rays, and converts the sensed infrared rays into a digital value. The sloped surface detector 10 includes a first motor driver 11 driven under the control of the controller 20 and a first motor M1 driven by the first motor driver 11. An infrared ray generator 12, driven by the first motor M1, projects infrared rays on a screen surface. An infrared ray receiver 13 receives the infrared rays reflected at the screen surface. An infrared ray reception data processor 14 processes data received by the infrared ray receptor 13. A level changer 15 changes a level of the data received from the infrared ray reception data processor 14. An analog/digital converter converts outputs of the level changer 15 into digital data.

The infrared ray generator 12 and the infrared ray receiver 13 are mounted externally of the projector.

The controller 20 generates a driving control signal based on a slope angle of the screen surface which is detected using the output value of the sloped surface detector 10. The controller 20 includes a wave detector 21 for comparing the digital data received from the analog/digital converter 16 to a preset reference value. A timer 22 is used for timing the rotation time of the first motor M1. An angle detector 23 is responsive to the output of the wave detector 21 and detects the sloped angle α between the line of projection and the screen surface by using the time received from the timer 22. A motor driving controller 24 generates a driving control signal for controlling the driver 30 according to the detected angle.

The wave detector 21 includes a receiver 21a for receiving the data output by of the analog/digital converter 16, a reference value memory 21b for storing a reference value, and a comparator 21c for comparing the valve input to the receiver 21a with the stored reference value.

The reference value is a digital value of the maximum amount of the infrared rays received by the infrared ray receiver 13 and stored after the level has been changed by the level changer 15.

The driver 30, in response to the driving control signal received from the controller, drives the LCD panel. The driver 30 includes a second motor driver 31 which is driven in response to the driving control signal received from the controller 20. A second motor M2 is driven by the second motor driver 31. A gear set 32 is driven by the second motor M2 and to drive the LCD panel.

The gear set 32 includes a first gear 32a which is driven by the second motor M2, and a second gear 32b which is connected to an LCD panel mounting shaft 1g and is driven by the first gear 32a.

The terminal 40 is either a key pad wired to the system or a remote control for applying a key signal to adjust for the sloped surface, the keys including a sloped surface adjustment key for displaying a corrected image based on an obtained slope angle of the screen surface. The key activates the motor driving controller 24.

Figure 6:
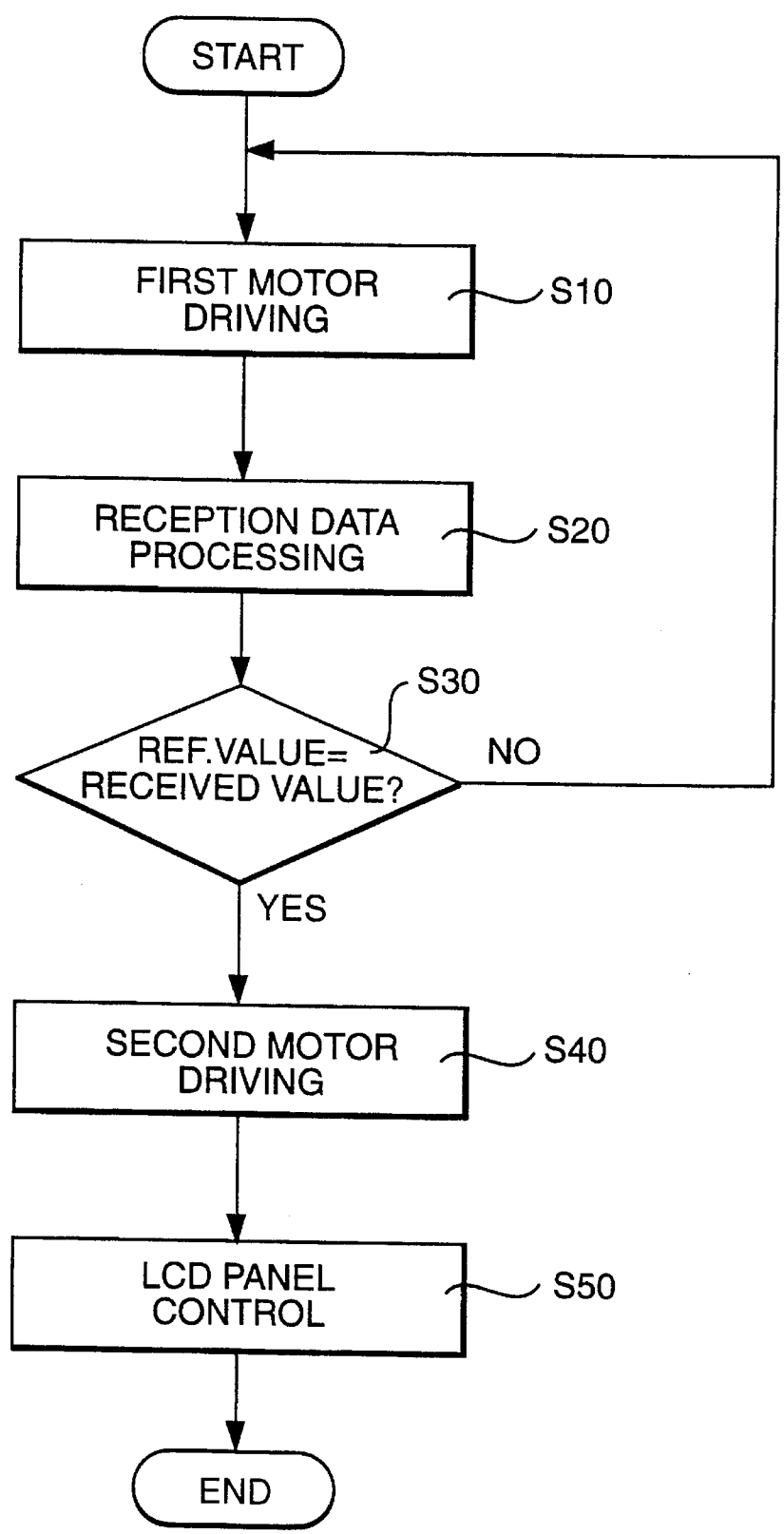
FIG. 6 is a flow chart of the operation of the system shown in FIG. 5.

FIG. 6 is a flow chart showing an operation in accordance with the system shown in FIG. 5 and a first embodiment of this invention.

First, upon application of the sloped angle adjustment key upon the change of a projection surface, the first motor M1, which is driven by the first motor driver 11 under the control of the motor driving controller 24, causes the infrared ray generator 12 to project infrared rays onto the screen surface step (S10).

During projection of infrared rays from the infrared ray generator 12, the infrared ray receiver 13 receives the infrared rays reflected by the screen surface and outputs reception level data to the infrared ray reception data processor 14. The infrared ray reception data processor 14 processes the reception level data and outputs it to the level changer 15, where the received data is amplified to a value that can be readily processed in later stages.

The amplification value of the level changer 15 is converted into a digital value by the analog/digital converter 16, and applied to the receiver 21a of the controller 20, as shown in step S20.

In step S30, the comparator 21c compares the value output by the receiver 21a to the reference value stored in the reference value memory 21b. A high signal is generated when the value output by the receiver 21a is equal to the reference value, and a low signal is generated when the value from the receiver 21a is less than the reference value.

The reference value stored in the reference value memory 21b corresponds to the maximum data value received by the infrared ray receiver 13. Therefore, the reference value corresponds to a digital value of the maximum amount of infrared rays received by the infrared ray receiver 13 and stored after amplification. The maximum reference value possible is when the screen surface is ninety degrees relative to the projection line.

Since the image on the screen surface is not normal when the output of the comparator 21c is low, the angle detector 23 applies a control signal that causes the first motor driver 11 to operate continuously.

As the first motor driver 11 and thus the first motor MI are driven continuously, steps S20 and S30 in the processing of received data and comparing the data to the reference value are performed repeatedly.

If the received data is found to be equal to the reference value as the result of the comparison, the comparator 21c applies a high signal to the angle detector 23. The angle detector 23 detects the sloped angle α of the screen surface based on a time determined by the timer 22.

The angle detection of the angle detector 23 is completed by searching for sloped angles α stored in memory that correspond to energization energy at energization periods of motor M1 registered by timer 22. The angle detector 23 stores angle values corresponding to each of the times (e.g., one second: 10 deg., two seconds: 20 deg., . . . ).

For example, if the searching time of the timer 22 is +2 seconds, the angle detector 23 determines that the sloped angle α of the screen surface is 20 deg., and if the searching time of the timer 22 is −2 seconds, the angle detector 23 determines that the sloped angle α of the screen surface is −20 deg.

Herein, the + and − of the times and the sloped angle α of the screen surface indicate a direction of rotation of the motor.

The sloped angle α of the screen surface is obtained by the angle detector 23 based on the elapsed driving time of the motor M1 up to the present time. The sloped angle α is output to the motor driving controller 24, which drives the second motor driver 31.

The second motor M2, driven by the second motor driver 31, drives the gear set 32 according to the angle value obtained by the angle detector 23, thereby driving the LCD panel 1d through the angle θ, i.e., the sloped angle α of the screen surface, thereby correcting the image on the screen surface as shown in steps S40 and S50.

Thus, the device for correcting an image projected on a sloped surface in accordance with the first embodiment of this invention can automatically adjust for the sloped angle α of the screen surface in response to the depression of a key on a remote controller or a key pad.

The method for correcting an image projected on a sloped surface in accordance with the first embodiment of this invention is to be explained by referring to FIG. 6.

When a user depresses the sloped surface adjustment key of terminal 40 to adjust for a change of a projection surface sloped angle, infrared rays are projected onto the screen surface in response to depression of the sloped surface adjustment key.

In step S20, the projected infrared rays reflected by the screen surface are received and processed. The processing of the received infrared rays includes changing the signal level and converting the analog signals into digital data.

Comparing step S30 is then performed to compare the received data processed in step S20 to a reference value.

Steps S40 and S50 for controlling a LCD panel are performed based on the sloped angle α of the screen surface determined according to the output of the timer, until the received data is equal to the reference value in the comparing step S30. Therefore, if the received data and the reference value are equal, the sloped angle α of the screen surface is determined, and the second motor M2 is driven in the appropriate direction to drive the LCD panel by the amount of the sloped angle α of the screen surface. The LCD panel is then moved by the amount of the sloped angle α of the screen surface.

Figure 7:
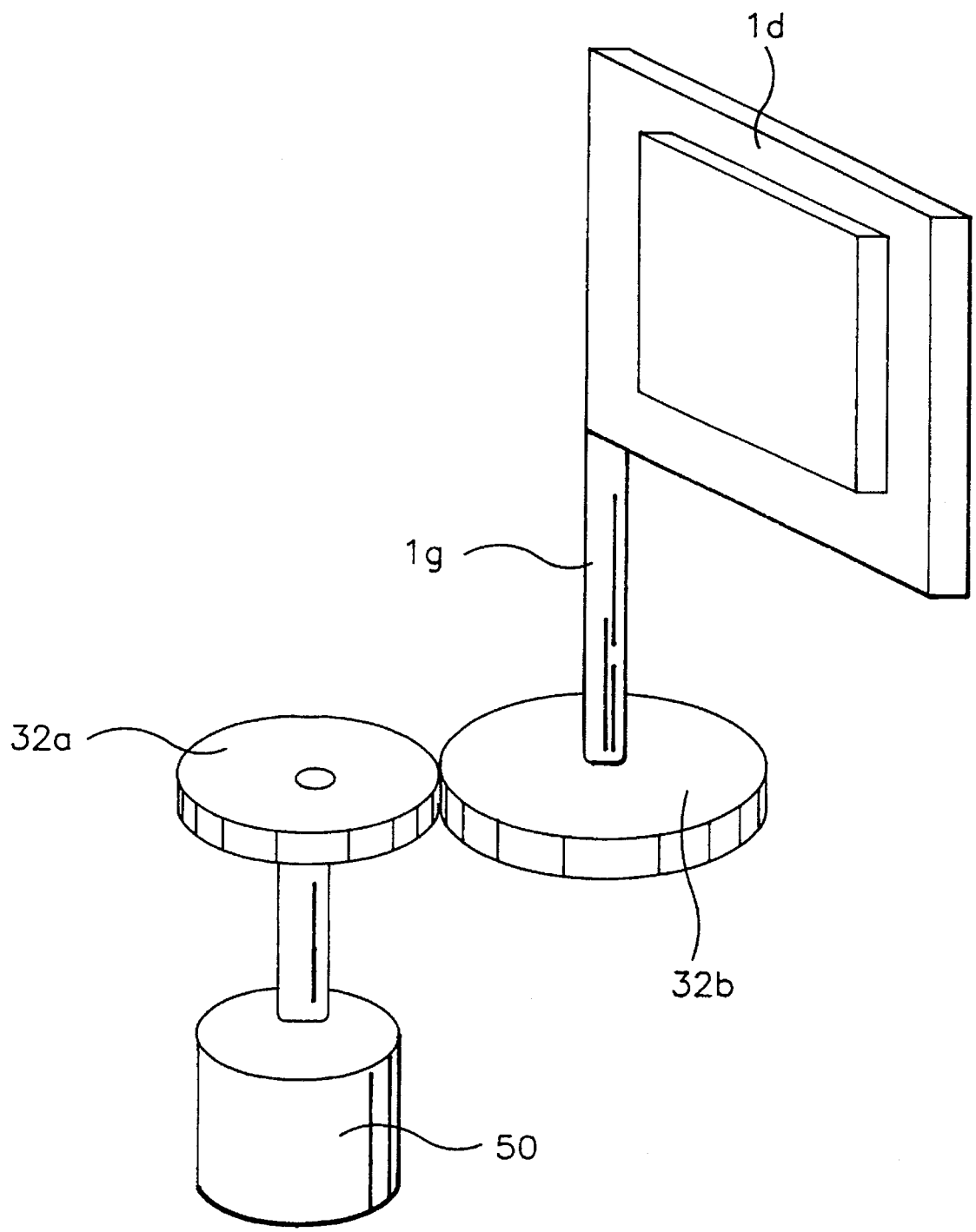
FIG. 7 shows a manual LCD adjusting part utilized in accordance with a second embodiment of this invention.

A device for correcting an image projected on a sloped surface in accordance with a second embodiment of this invention allows a user to correct an image on a screen surface manually, and further includes, as shown in FIG. 7, a manual LCD adjuster 50 connected to the first gear 32a or the second gear 32b of the driver 30; the first and second gears being located in the gear set 32 shown in FIG. 5. The manual LCD adjuster 50 allows for manually adjusting the LCD until the image size is a normal size determined by watching the image size projected on the screen.

Figure 8:
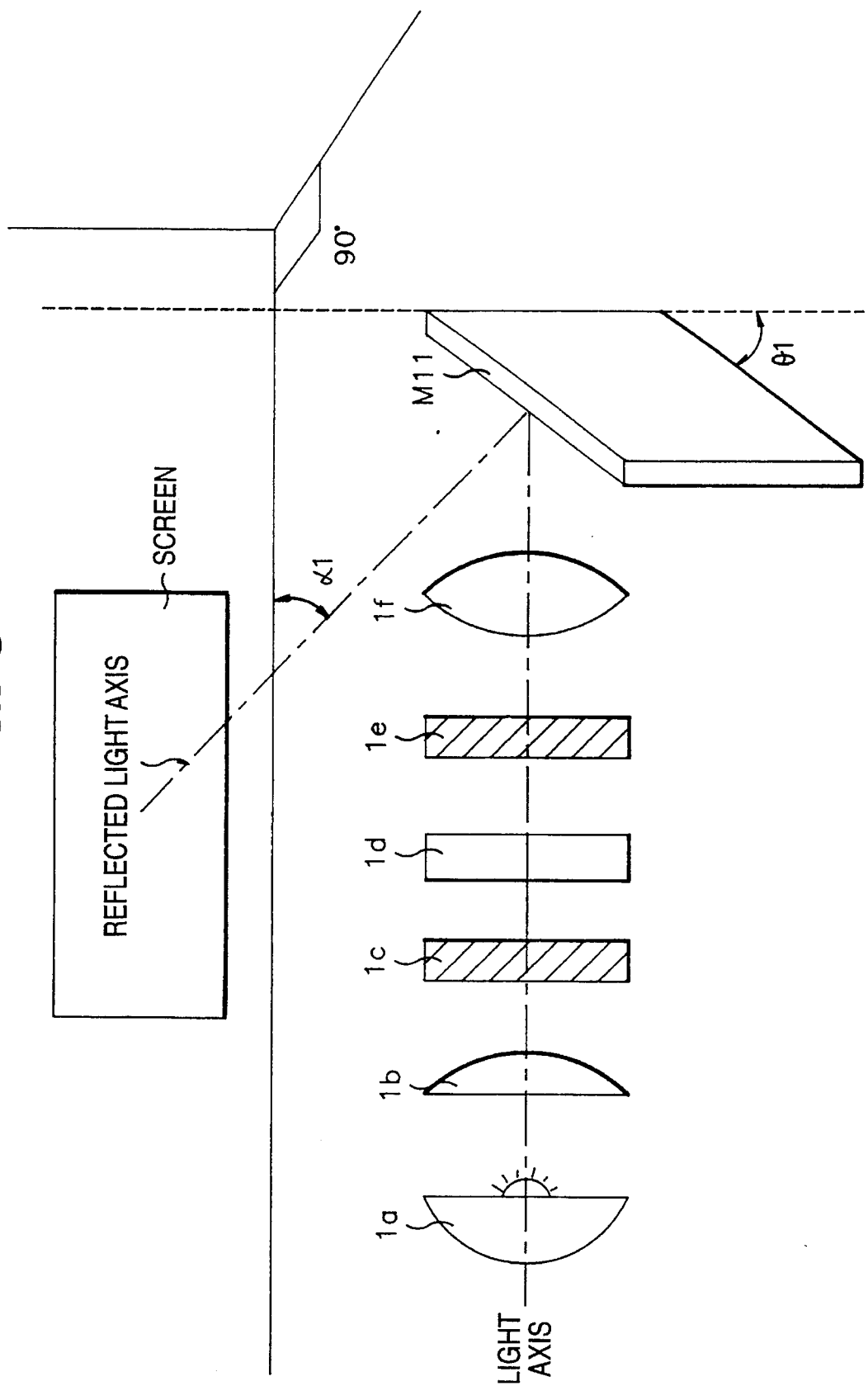
FIG. 8 shows an adjustable mirror utilized in accordance with a third embodiment of this invention.

FIG. 8 shows a device for correcting an image projected on a sloped surface in accordance with a third embodiment of this invention, which corrects the image on a screen surface using a mirror M11.

The device for correcting an image projected on a sloped surface in accordance with the third embodiment of this invention is identical to the first embodiment, except that the first embodiment has the LCD panel shaft 1g of the LCD panel 1d connected to the gear set 32, and the third embodiment has a mirror shaft connected to the gear set 32 for controlling the mirror M11. Therefore, the general operation of the device was described with reference to the first embodiment.

Referring to FIG. 8, θ1 is an angle between a vertical line parallel to the screen surface and the mirror M11, and α1 is an angle between the light axis of projection and the screen surface. The angle α1 is detected in the same manner as in the first embodiment, and the mirror M11 is driven by an amount of θ1, i.e., by an amount of α1.

Figure 9:
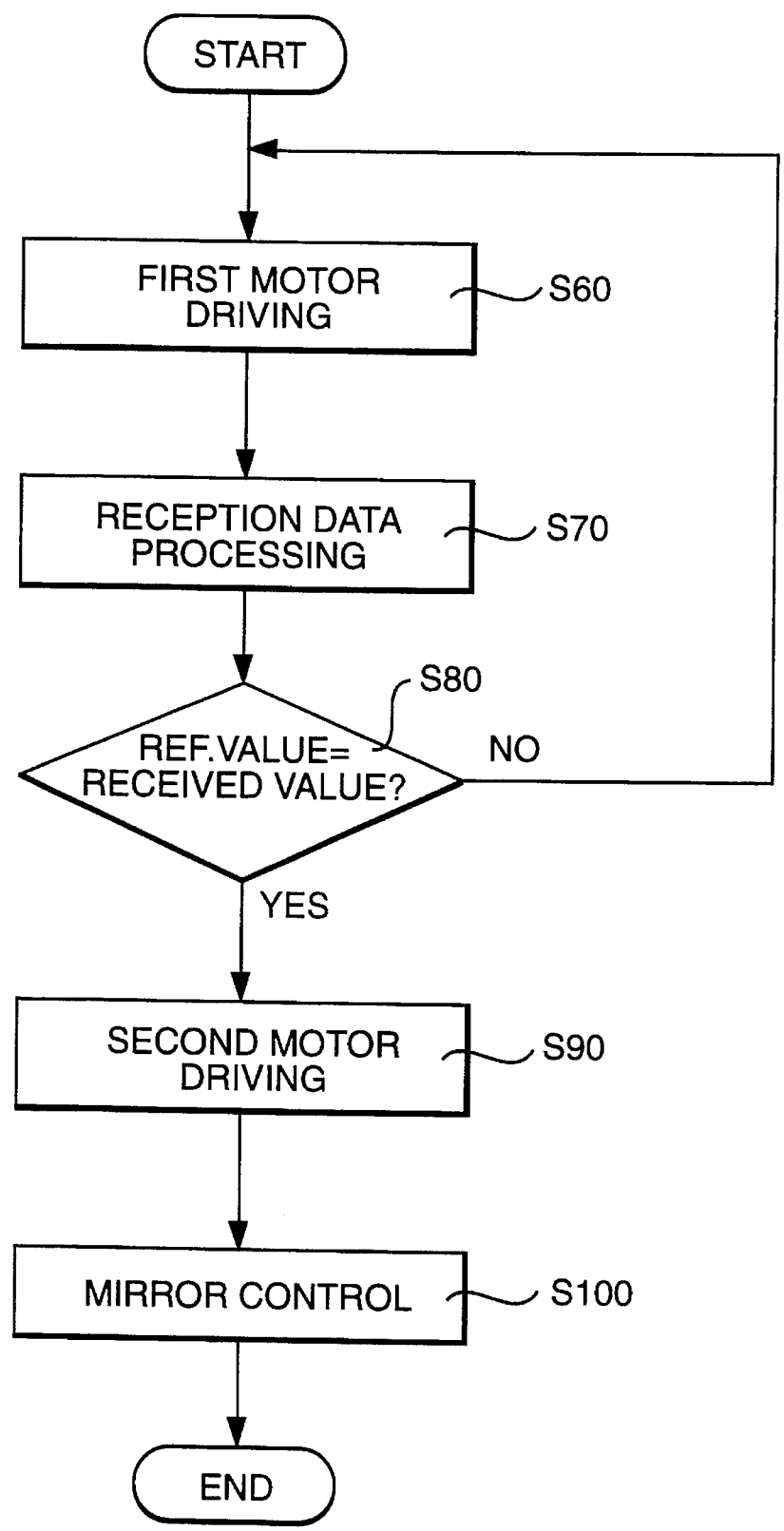
FIG. 9 is a flow chart of the operation of the system for correcting an image in accordance with the third embodiment of this invention.

As shown in FIG. 9, a method for correcting an image projected on a sloped surface in accordance with the third embodiment of this invention is the same as the flow chart of FIG. 6 of the first embodiment, except that the step S50 of controlling the LCD panel, is replaced with a step S100 of controlling the mirror. The mirror M11 is controlled so that the angle θ1 between the mirror M11 and a vertical line parallel to the screen surface and the angle α1 between the light axis and the screen surface are the same.

In the third embodiment, the driver 30 is responsive to the driving control signal output by the controller 20, to drive the mirror M11. The driver 30 includes the second motor driver 31 which operates in response to the driving control signal received from the controller 20, the second motor M2 driven by the second motor driver 31, and the gear set 32 driven by the second motor M2 for driving the mirror M11.

The gear set 32 includes the first gear 32a which is driven by the second motor M2, and the second gear 32b which is connected to the mirror shaft M11a and is driven by the first gear 32a.

FIG. 9 is a flow chart showing an operation in accordance with the third embodiment of this invention. The operation of the device is the same as shown in FIG. 6 and discussed above except that adjustments are made to the mirror M11 in order to correct the image. Steps S60–S90 correspond to steps S10–S40 of FIG. 6 and are discussed above.

In the third embodiment, the second motor M2, driven by the second motor driver 31, drives the gear set 32 according to the angle value obtained by the angle detector 23, to drive the mirror M11 by an amount of the angle θ1, i.e., the angle between the light axis and the screen surface, and to correct the image on the screen surface to normal (steps S90 and S100).

Thus, the device for correcting an image projected on a sloped surface in accordance with the third embodiment of this invention can automatically adjust for the sloped angle α of the screen surface by depression of a key on the remote controller or the key pad (terminal 4).

Steps for controlling a mirror S90 and S100 are performed based on the angle between the light axis of projection and the screen surface determined according to the output of the timer, until the comparison step S80 finds that the received data is equal to the reference value. Therefore, until the received data and the reference value are equal, the angle between the light axis and the screen surface is determined, and the second motor M2 is driven in normal or reverse direction to drive the mirror M11 by the amount of the angle between the light axis and the screen surface based on a vertical line parallel to the screen surface.

Figure 10:
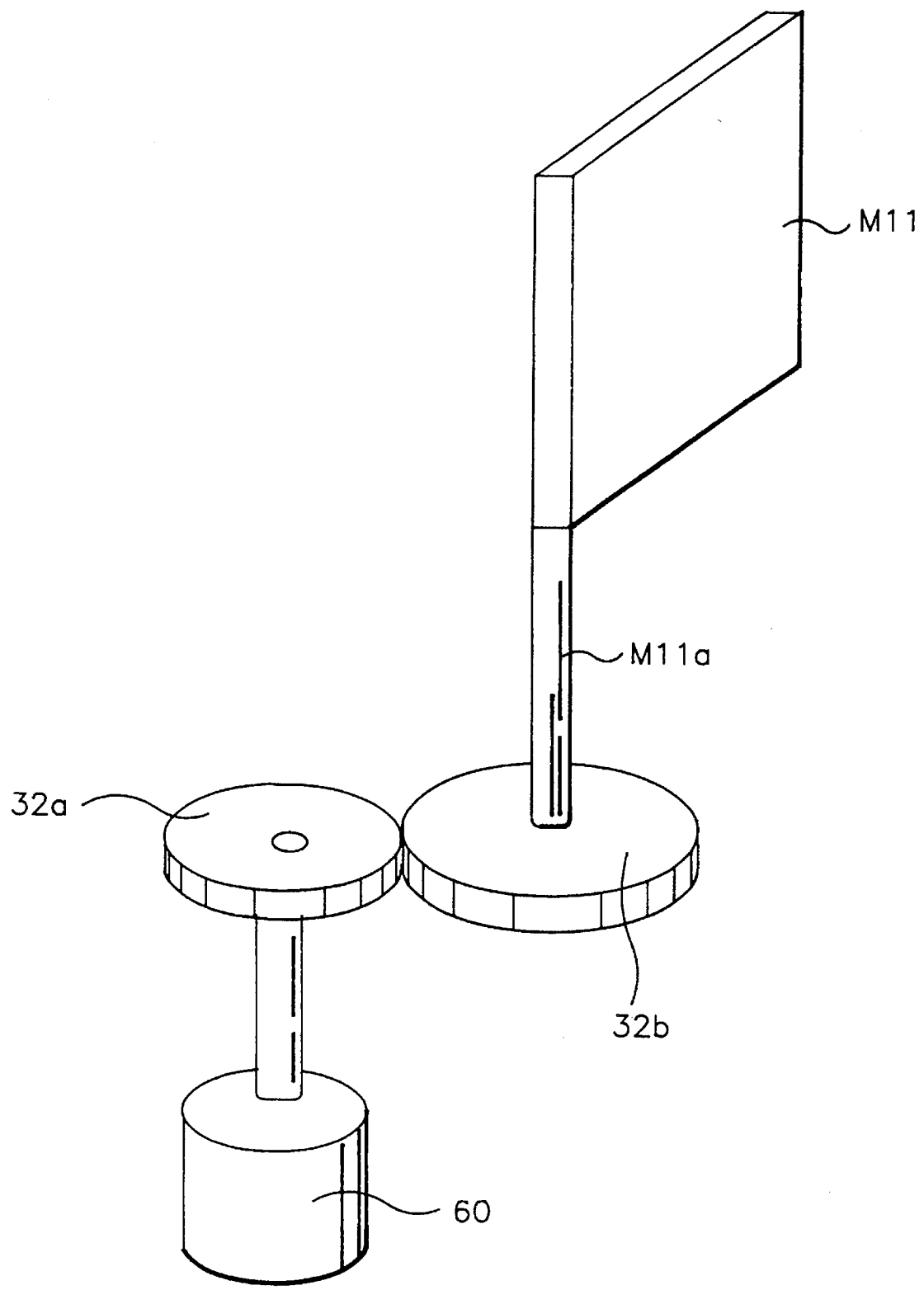
FIG. 10 shows a manual mirror adjusting part utilized in accordance with a fourth embodiment of this invention.

A device for correcting an image projected on a sloped surface in accordance with a fourth embodiment of this invention allows a user to correct the image on the screen surface manually. As shown in FIG. 10, a manual mirror adjuster 60 is connected to the first gear 32a or the second gear 32b of the driver 30, the first and second gear being located in the gear set 32 as shown in FIG. 5. The manual mirror adjuster 60 allows for manually adjusting the mirror until the image size is a normal size as determined by watching the image size projected on a screen.

The device for correcting an image projected on a sloped surface in accordance with the fourth embodiment of this invention is identical to the third embodiment of this invention, except for the addition of the manual mirror adjuster 60, and the identical reference numbers are used for the identical parts.

Figure 11:
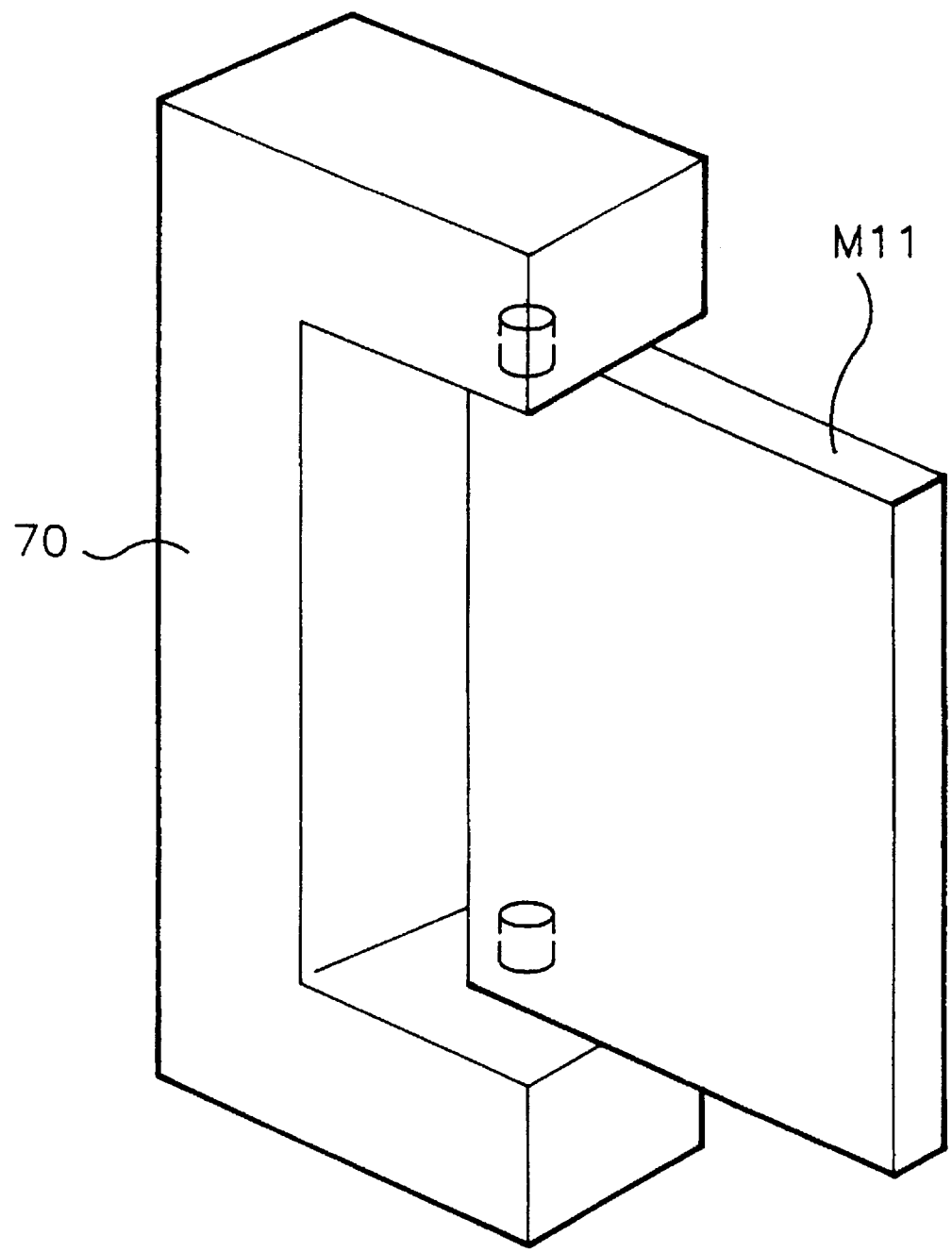
FIG. 11 shows a mirror supporting part utilized in accordance with a fifth embodiment of this invention.

As shown in FIG. 11, a device for correcting an image projected on a sloped surface in accordance with a fifth embodiment of this invention allows a user to correct the image on the screen surface manually and further includes a mirror support 70 having the mirror M11 adjustably mounted thereon. Adjusting the mirror support 70 adjusts the image size such that a user watching may adjust the image size projected on the screen.

As has been explained, this invention can eliminate the inconvenience of the conventional projector which requires that the projector itself be manually moved to a position that causes the line of projection to be ninety degrees relative to the screen. This invention corrects the image size of an image projected onto a sloped surface through either an automatic adjustment of a LCD panel or a mirror upon depression of a remote key, or a manual adjustment of the LCD panel or a mirror.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A device for adjusting a size of an image projected on a screen surface that is at an oblique angle to a line of projection of a projector, the device having a LCD panel and comprising:

a sloped surface detection part for projecting infrared rays on the screen surface, sensing infrared rays reflected off of the screen surface, and converting the sensed infrared rays into a digital output value;

a control part, responsive to the digital output value, for determining the oblique angle between the screen surface and the line of projection of the projector by comparing the digital output value with a reference value and for generating a driving control signal based on the determined oblique angle; and a driving part driven in response to the driving control signal received from the control part for adjusting the size of the image by adjusting the LCD panel so that an angle between the LCD panel surface and the line of projection is equal to the determined oblique angle.

2. The device as claimed in claim 1, wherein the driving part includes:

a motor driving part, responsive to the driving control signal received from the control part, for outputting a first driving signal, a motor, responsive to the first driving signal, for producing a motor output, and a gear part, responsive to the motor output, for adjusting the LCD panel.

3. The device as claimed in claim 1, further including remote control means for outputting a signal to activate the control part.

4. The device as claimed in claim 1, further comprising a manual LCD adjustment part connected to the driving part for adjusting the LCD panel.

5. A device for adjusting a size of an image projected on a screen surface that is at an oblique angle to a line of projection of a projector, the device having a LCD panel and comprising:

a sloped surface detection part for projecting infrared rays on the screen surface, sensing infrared rays reflected off of the screen surface, and converting the sensed infrared rays into a digital output value, the sloped surface detection part including:

a first motor driving part, responsive to a driving control signal, for outputting a first driving signal, a first motor, responsive to the first driving signal, for producing a motor output, an infrared ray generation part, responsive to the motor output, for projecting infrared rays on the screen surface, an infrared ray reception part for receiving the infrared rays reflected by the screen surface and producing infrared reception analog data, an infrared ray reception data processing part for processing the infrared reception analog data, and an analog/digital converting part for converting the reception analog data to reception digital data;

a control part, responsive to the reception digital data, for determining the oblique angle between the screen surface and the line of projection of the projector and for generating the driving control signal based on the determined oblique angle; and a driving part driven in response to the driving control signal received from the control part for adjusting the size of the image by adjusting the LCD panel.

6. The device as claimed in claim 5, wherein the control part includes:

means for comparing the reception digital data to a preset reference value, a timer for determining an elapsed time of the motor output, an angle detection part, responsive to the comparing means, for detecting the angle of the screen surface relative to the line of projection, using the elapsed time determined by the timer, and a motor driving control part, responsive to the detected oblique angle, for generating the driving control signal for controlling the driving part.

7. The device as claimed in claim 6, wherein the reference value corresponds to a maximum amount of received infrared rays.

8. A device for adjusting a size of an image projected on a screen surface that is at an oblique angle to a line of projection of a projector, the device having a LCD panel and comprising:

a sloped surface detection part for projecting infrared rays on the screen surface, sensing infrared rays reflected off of the screen surface, and converting the sensed infrared rays into a digital output value;

a control part, responsive to the digital output value, for determining the oblique angle between the screen surface and the line of projection of the projector and for generating a driving control signal based on the determined oblique angle; and a driving part driven in response to the driving control signal received from the control part for adjusting the size of the image by adjusting the LCD panel, wherein the driving part includes:
  a motor driving part, responsive to the driving control signal received from the control part, for outputting a first driving signal,
  a motor, responsive to the first driving signal, for producing a motor output, and
  a gear part, responsive to the motor output, for adjusting the LCD panel, the gear part including:
    a first gear driven by the motor output, and
    a second gear, driven by the first gear and connected to a mounting shaft for the LCD panel, for adjusting an angular position of the LCD panel.

9. A device for adjusting a size of an image projected on a projection surface that is at an oblique angle to a line of projection of a projector, and having a LCD panel and a mirror, the device comprising:

a sloped surface detection part for projecting infrared rays onto the projection surface, sensing an amount of infrared rays reflected off of the projection surface, and converting the sensed amount of the infrared rays into a digital output value;

a control part, responsive to the digital output value, for determining the oblique angle between the line of projection of the projector and the projection surface by comparing the digital output value to a reference value and for generating a driving control signal based on the determined oblique angle; and a driving part, responsive to the driving control signal, for adjusting the size of the image by adjusting the mirror so that an angle between the mirror and the screen surface is equal to the determined oblique angle.

10. The device as claimed in claim 9, wherein the driving part includes:

a motor driving part, responsive to the driving control signal received from the control part, for outputting a first driving signal, a motor, responsive to the first driving signal, for producing a motor output, and a gear part, responsive to the motor output, for adjusting the mirror.

11. The device as claimed in claim 9, further comprising a manual mirror adjustment part connected to the driving part for adjusting the mirror.

12. The device as claimed in claim 9, further comprising a mirror supporting part having the mirror adjustably mounted for supporting the mirror.

13. The device as claimed in claim 9, further including remote control means for outputting a signal to activate the control part.

14. A device for adjusting a size of an image projected on a projection surface that is at an oblique angle to a line of projection of a projector, and having a LCD panel and a mirror, the device comprising:

a sloped surface detection part for projecting infrared rays onto the projection surface, sensing an amount infrared rays reflected off of the projection surface, and converting the sensed amount of the infrared rays into a digital output value, the sloped surface detection part including:
  a first motor driving part, responsive to a driving control signal, for outputting a first driving signal,
  a first motor, responsive to the first driving signal, for producing a motor output,
  an infrared ray generation part, responsive to the motor, for projecting the infrared rays on the projection screen,
  an infrared ray reception part, responsive to the infrared rays projected by the infrared ray generation part, for receiving the infrared rays reflected by the projection surface, and
  an infrared ray reception data processing part for processing the digital output value;

a control part, responsive to the digital output value, for determining the oblique angle between the line of projection of the projector and the projection surface and for generating the driving control signal based on the determined oblique angle; and a driving part, responsive to the driving control signal, for adjusting the size of the image by adjusting the mirror.

15. The device as claimed in claim 14, wherein the control part includes:

means for comparing the digital output value to a preset reference value, a timer for determining an elapsed time of the motor output, an angle detection part, responsive to the comparing means, for detecting the oblique angle of the projection surface relative to the line of projection, using the elapsed time determined by the timer, and a motor driving control part, responsive to the detected oblique angle, for generating the driving control signal for controlling the driving part.

16. The device as claimed in claim 15, wherein the reference value corresponds to a maximum amount of received infrared rays.

17. A device for adjusting a size of an image projected on a projection surface that is at an oblique angle to a line of projection of a projector, and having a LCD panel and a mirror, the device comprising:

a sloped surface detection part for projecting infrared rays onto the projection surface, sensing an amount infrared rays reflected off of the projection surface, and converting the sensed amount of the infrared rays into a digital output value;

a control part, responsive to the digital output value, for determining the oblique angle between the line of projection of the projector and the projection surface and for generating a driving control signal based on the determined angle; and a driving part, responsive to the driving control signal, for adjusting the size of the image by adjusting the mirror, the driving part including:
  a motor driving part, responsive to the driving control signal received from the control part, for outputting a first driving signal,
  a motor, responsive to the first driving signal, for producing a motor output, and
  a gear part, responsive to the motor output, for adjusting the mirror, the gear part including:

a first gear driven by the motor output, and a second gear, driven by the first gear and connected to a mounting shaft for the mirror, for adjusting an angular position of the mirror.

18. A method for adjusting a size of an image projected on a screen surface that is at an oblique angle to a line of projection of a projector, the method comprising the steps of:

projecting infrared rays onto the screen surface in response to an adjustment key signal;

receiving the infrared rays reflected by the screen surface;

producing output signals indicative of the amount of received infrared rays;

determining a reception time period of the received infrared rays;

comparing the output signals to a reference value; and adjusting a LCD panel in the projector based on the determined reception time period, while the output signals differ from the reference value.

19. The method as claimed in claim 18, wherein the reference value corresponds to a maximum level of the output signals.

20. The method as claimed in claim 18, wherein the LCD panel is adjusted through an adjustment angle equal to the oblique angle between the line of projection and the screen surface.

21. A method for adjusting a size of an image projected on a screen surface that is at an oblique angle to a line of projection of a projector, the method comprising the steps of:

projecting infrared rays onto the screen surface in response to an adjustment key signal;

receiving the infrared rays reflected by the screen surface;

producing output signals indicative of the amount of received infrared rays;

determining a reception time period of the received infrared rays;

comparing the output signal to a reference value; and adjusting a mirror in the projector based on the determined reception time period, while the output signals differ from the reference value.

22. The method as claimed in claim 21, wherein the reference value corresponds to a maximum level of the output signals.

23. The method as claimed in claim 21, wherein the mirror is adjusted through an adjustment angle equal to the oblique angle between the line of projection and the screen surface.

* * * * *